Feb. 23, 1965     E. M. McPHERSON     3,170,598
BAR DISPENSER

Filed Nov. 19, 1962     4 Sheets-Sheet 2

INVENTOR.
ELYWN M. McPHERSON
BY Moore, White & Burd
ATTORNEYS

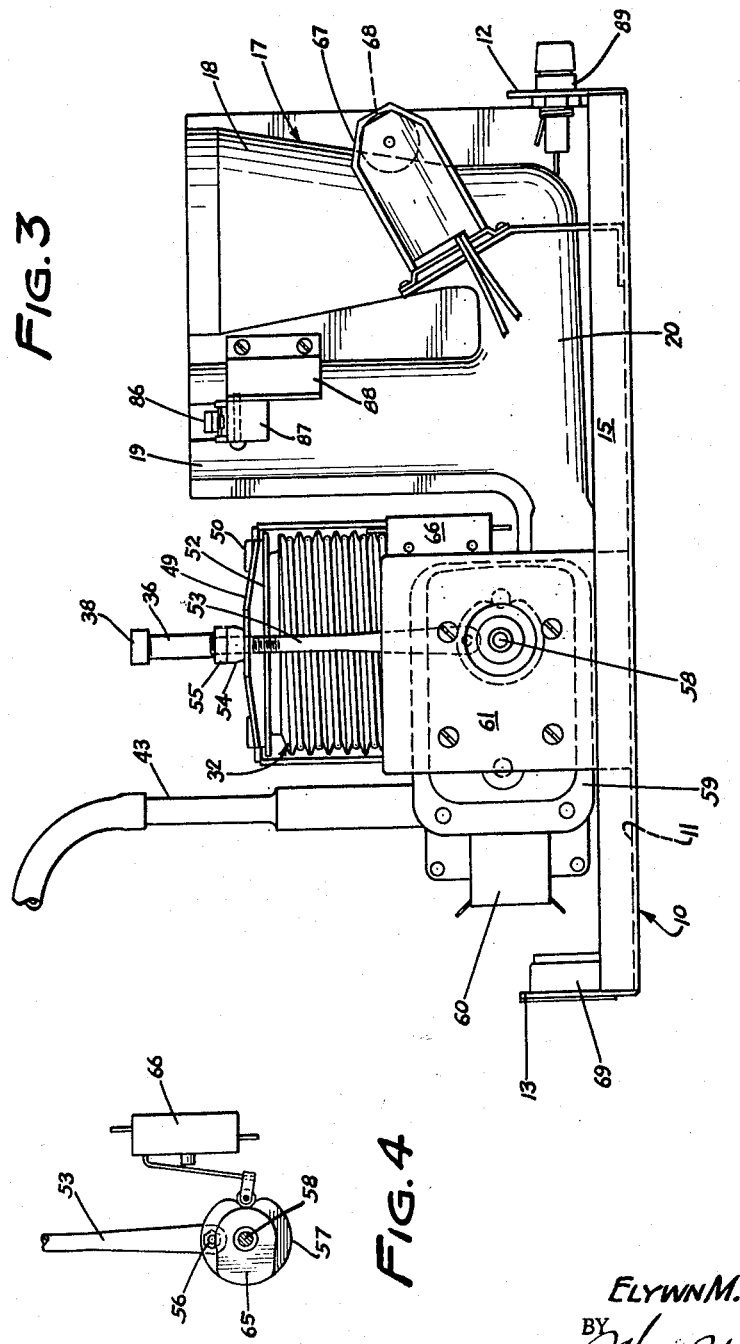

Feb. 23, 1965   E. M. McPHERSON   3,170,598
BAR DISPENSER
Filed Nov. 19, 1962   4 Sheets-Sheet 4
FIG. 5
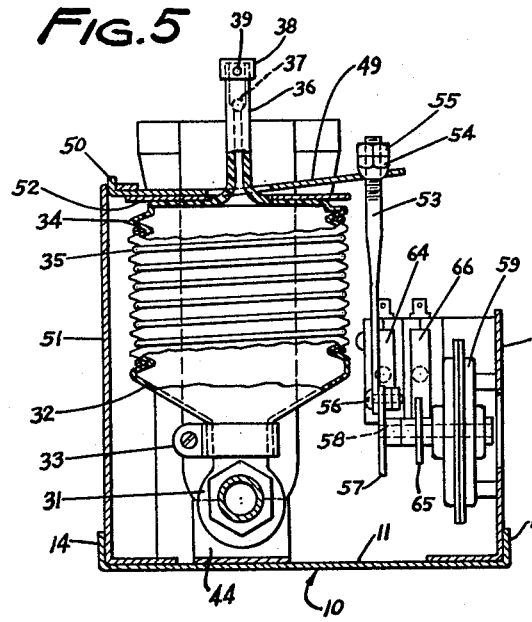
FIG. 6
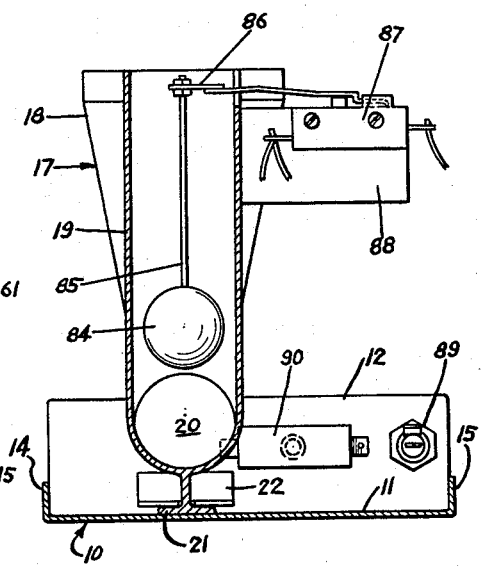
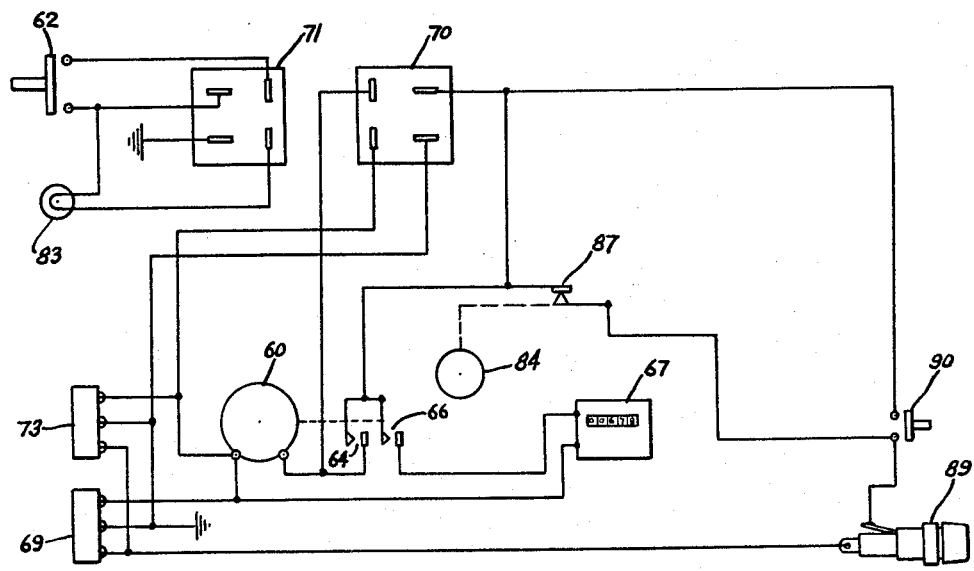
FIG. 7
INVENTOR.
ELYWN M. MCPHERSON
BY Moore, White & Burd
ATTORNEYS _United States Patent Office_ 3,170,598
Patented Feb. 23, 1965

3,170,598
BAR DISPENSER
Elywn M. McPherson, Hopkins, Minn., assignor to McPherson Enterprises, Inc., Minneapolis, Minn., a corporation of Iowa
Filed Nov. 19, 1962, Ser. No. 238,346
11 Claims. (Cl. 222—36)

This invention relates to dispensing means for automatically measuring out and delivering a predetermined smaller quantity of liquid from a larger container of that liquid. More particularly, the present invention relates to a device for automatically measuring out a predetermined amount of distilled spirits or other beverage into a glass without the intermediate use of a jigger or other measure.

The principal object of the present invention is to provide a device for automatically dispensing a predetermined quantity of liquor directly into a glass without the means of a measuring cup or jigger, and without the spillage and waste which the use of a measuring cup or a jigger usually entails. At the same time, it is an object of the present invention to provide a device which will dispense uniform predetermined measured quantities of liquor, and automatically count each one so that the proprietor of the bar or restaurant in which the device is used can maintain an accurate check on the volume of liquor being used. This is useful both in determining that full value is received from every bottle, and that payment is received for each drink served.

The bar dispenser, according to the present invention, is adapted to be provided with security measures by which unauthorized after-hours dispensing of liquor may be prevented, and by which unauthorized dispensing of drinks without payment may be detected. The bar dispenser, according to the present invention is compact, sanitary and adjustable to dispense a pretermined amount of liquor in a virtually indefinite number of sizes. The dispenser is adapted to accommodate any standard size or shape of liquor bottle. It can be readily emptied in the event the brand or kind of liquor being served is to be changed.

Although previous attempts have been made to produce liquor dispensers for the accomplishment of one or more of the above objects, none has been completely satisfactory in all respects. They have either been inaccurate or cumbersome, or expensive or inconvenient to use, or subject to any one of a number of disadvantages.

The bar dispenser, according to the present invention, is illustrated in the drawings in which the same numerals refer to corresponding parts and in which:

FIG. 3 is a further elevation with housing removed viewed generally along the line 3—3 of FIG. 2;

FIG. 4 is a partial elevation showing cams otherwise hidden from view in FIG. 3;

FIG. 5 is a partial end elevation in section taken generally along the line 5—5 of FIG. 2 and in the direction of the arrows and shown with the motor removed;

FIG. 6 is a partial elevation in section on the line 6—6 of FIG. 2 and in the direction of the arrows; and FIG. 7 is a diagram of the electrical circuitry incorporated in the dispensing unit.

Figure 1:
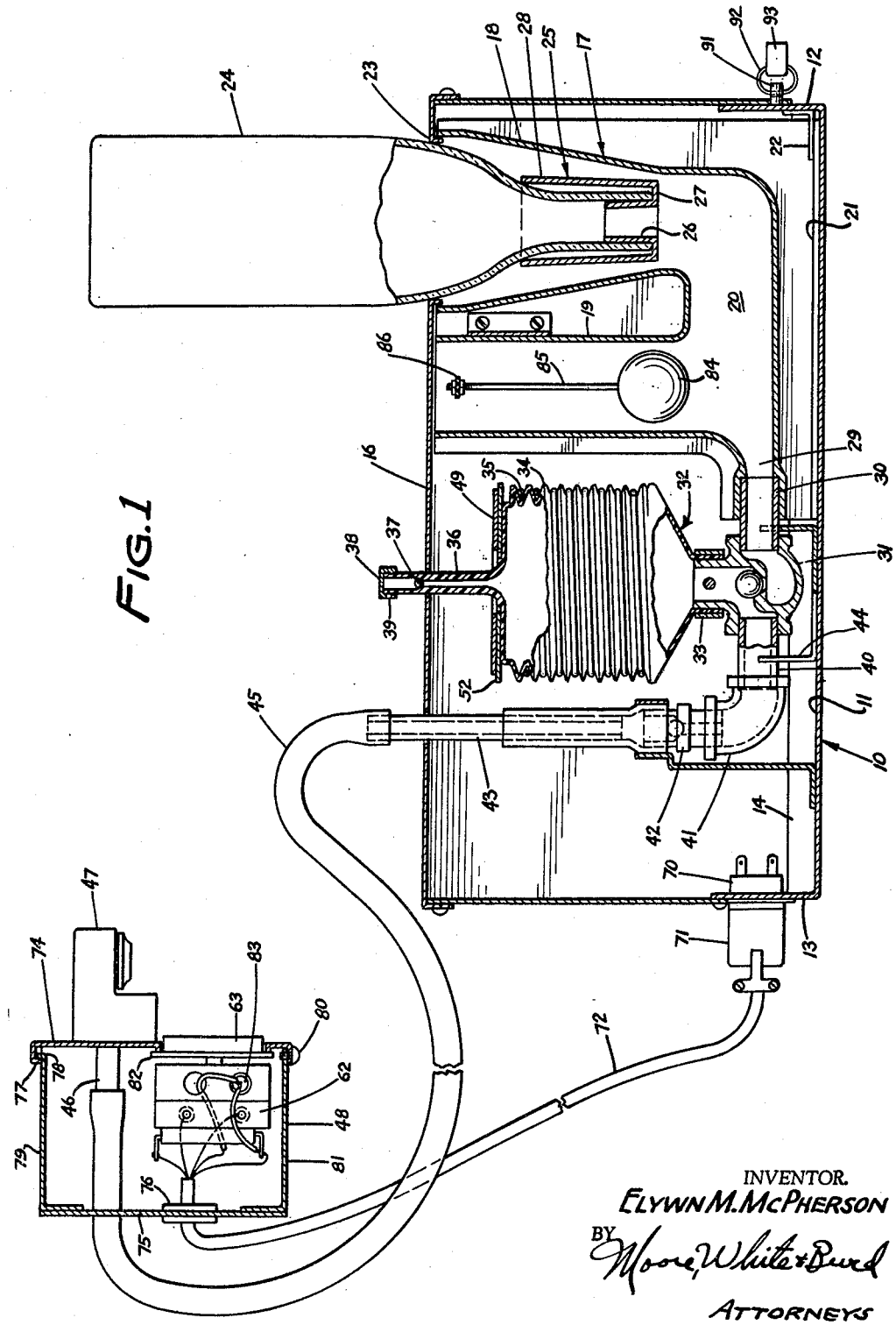
FIG. 1 is a vertical elevation in section through the dispensing unit generally on the line 1—1 of FIG. 2 and in the direction of the arrows.
Figure 2:
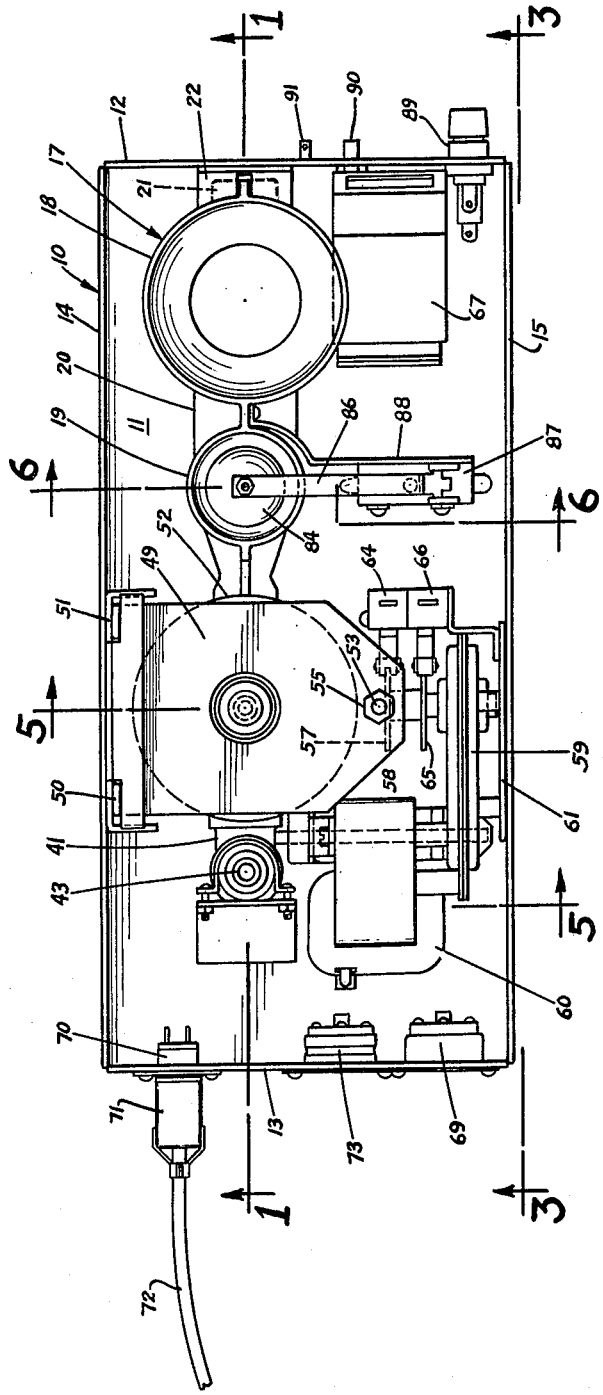
FIG. 2 is a top plan view of the dispensing unit according to the present invention shown with the housing removed.

Referring now to the drawings, the dispensing apparatus, according to the present invention, comprises a base indicated generally at 10, having a bottom wall 11, a front wall 12, a back wall 15, and a pair of side walls 14 and 15. The base 10 is composed of suitable strong rigid material, such as heavy gauge sheet metal. As shown in FIG. 1 only, the mechanism mounted on base 10 is enclosed in a housing structure indicated generally at 16, and being of a size and shape adapted to fit telescopically over and be secured to the base 10. For clarity, the enclosing housing has been omitted from other figures of the drawing.

Mounted on base 10 is a liquor supply vessel indicated generally at 17. Vessel 17 includes generally a vertically upstanding liquor receiving receptacle 18, a level indicating tube 19, and a generally horizontal intercommunicating channel 20. The supply vessel is desirably formed in one piece by molding from resinous material which is non-toxic and insoluble in alcohol. The vessel is molded with a supporting foot 21 which rests on the bottom wall 11 of the base 10 and is secured by means of a slotted bracket 22 secured to the inside of the front wall 12 of the base.

A flanged opening 23 is provided in the top wall of housing 16, immediately overlying the open end of receptacle 18. The shoulder of the opening 23 serves to support and hold the shoulder of a bottle 24 to discharge the contents of the bottle into the receptacle. The revenue stamp and neck label of the bottle are protected from contact with the liquor in the supply vessel by means of a tubular neck cover 25. The neck cover 25 includes an inner tubular portion 26 adapted to fit securely in the inside of the neck of the bottle, an outwardly projecting annular flange 27 and a protective skirt 28 adapted to extend around and cover the outside of the neck of the bottle.

A discharge outlet 29 is provided at the lower end of the supply vessel 17. The supply vessel is connected by means of a short tubular fitting 30 to the inlet port of a three port T ball check valve 31. One port of check valve 31 is in direct communication with the bottom port of a resilient vertically disposed bellows pump 32 which is secured to the check valve by means of a suitable strap or band 33.

Bellows 32 is desirably composed of a resilient plastic material which is non-toxic unaffected by contact with alcohol and which is relatively unaffected by fatigue resulting from innumeral flexings. Polyethylene is a suitable material. The individual bellows pleats or folds 34 of the bellows pump 32 are desirably formed as a continuous spiral or helix. Then, a compression coil spring 35 is desirably disposed with its coils located in the valleys between the folds of the bellows to assist in return of the bellows to its open or relaxed position after compression.

The top end of the bellows pump 32 is provided with a relatively narrow vent tube 36, which is threaded at its free end. The inside diameter of vent tube 36 is slightly enlarged adjacent to the threaded end, and is provided with a ball check valve element 37. A cap fitting 38, having a vent hole 39, is provided on the end of the vent tube which projects through an opening to the exterior of the housing 16. Vent tube 36, valve element 37, and fitting 38 are used to expel air from the bellows pump to insure accurate measurement of liquid upon initiation of use of the dispensing unit, as explained in greater detail hereinafter.

The discharge port of check valve 31 is connected through a tubular fitting 40, to an elbow 41, and thence through a two port ball check valve 42 to a discharge tube 43, which also extends through an opening in the top wall of the housing 16. Check valve 31 and fittings 30 and 40 are supported in a bracket 44 from the bottom wall 11 of the base 10. The open end of discharge tube 43 is connected by means of flexible non-toxic and alcohol-proof resinous tubing to the fitting 46 of a spigot 47 of a dispensing head, indicated generally at 48; located at some site selected for the convenience of the bartender.

The liquid flow line through the dispensing unit is thus from bottle 24 into vessel 17, through fitting 30 and check valve 31 into bellows pump 32, from bellows pump 32, through check valve 31 and fitting 40 into elbow 41 and through check valve 42, pipe 43, tubing 45, fitting 46, to spigot 47, for discharge into a glass. This flow is in response to electro-mechanical operation of the device as hereinafter described.

Bellows pump 32 operates as a result of compression and relaxation in a vertical direction. A compression plate or lever 49 is hinged for pivotal movement at 50 to a vertical support or bracket 51 extending up from the bottom wall 11 and side wall 14 of the base 10. A wear plate 52, in the form of a large washer, is desirably interposed between the top surface of the bellows 32 and compression plate 49 in order to minimize the abrasive effect of the compression plate repeatedly bearing against the top of the bellows.

Compressive action of compression plate 49 is imparted through a connecting rod or link 53 which extends through a hole adjacent the edge of the compression plate on the opposite side of the bellows from pivoting hinge 50 and support 51. Connection between rod or link 53 and the compression plate is by means of a threaded nut 54 having one arcuate surface in contact with the compression plate whereby a ball and socket universal joint is effected for slight relative movement between the compression plate and connecting rod. A lock nut 55 insures against movement of nut 54. This is of importance to insure uniformity of measurement of successive portions of dispensed liquid since the amount of liquid dispensed is dependent upon the stroke of compression plate 49 which depends upon the stroke of rod 53 and the position of the nut 54 on the connecting rod.

The opposite end of connecting rod or link 53 is pivotly connected at 56 to a cam 57 secured to shaft 58 for rotation therewith. Shaft 58 is driven through a standard gear reduction box 59 by an electric motor 60. Electric motor 60 is coupled directly to the gear box, which is a standard purchased item selected to give the desired reduced speed of rotation to shaft 58. The gear box and motor are mounted in the base 10. The gear box is supported from a bracket 61 extending up from the bottom wall 11 and side wall 15 of the base.

Connecting rod 53 is mounted eccentrically with respect to cam 57 and upon each revolution of cam 57 bellows 32 is compressed by action of the pivoted compression plate 49, and is returned to its relaxed position by virtue of the natural resiliency of the bellows material supplemented by coil spring 35. On each compressive stroke, a predetermined amount of liquid is discharged from the bellows through the check valves and fittings to the spigot 47. Back flow into the supply vessel is prevented by the ball valving element of check valve 31. Upon relaxation of the bellows, liquor is drawn from the supply vessel unseating the ball element of check valve 31, but back flow from the discharge line is prevented by the ball element of check valve 42.

The cycle of cam 57 and stroke of connecting rod 53 is initiated electrically by actuation of switch 62 in the dispensing head 48 by pressing against the switch plate 63 which is located immediately under the spigot 47 so as to be pressed by the rim of the glass in which the measured amount of liquor is to be dispensed. Immediately upon initiation of its cycle of rotation, cam 57 actuates a normally open switch 64 to permit flow of current directly to motor 60, without the necessity of maintaining switch 62 closed during the entire dispensing cycle. Upon the completion of one cycle of rotation of cam 57, switch 64 is again opened to deenergize the motor.

A second cam 65 is secured to shaft 58 for rotation with the shaft and cam 57. On each cycle of rotation cam 65 actuates a normally open switch 66, which in turn actuates a counter 67 which records each operative cycle of the dispensing unit. Counter 67 contains a plurality of number wheels 68 which are visable through a port in the front wall of the housing 67 so that an accurate count may be kept of the number of drinks measured out by the dispensing unit during any given period.

An inlet power plug 69 is mounted in the rear wall 13 of the base 10. The terminals of plug 69 are adapted to engage the terminals of the plug of an extension cord to connect the dispensing apparatus to any standard commercial power source. An outlet socket 70 is also provided in the rear wall of the base to receive the terminals of plug 71 of extension cord 72 by which the dispensing head 48 is electrically connected to the dispensing unit. An auxiliary socket 73 is provided in the rear wall of the base as a convenience to permit several dispensing units to be interconnected for operation from the same power source.

The dispensing head 48 is so constructed that all of the operating elements are mounted on the face plate 74. This includes the spigot 47, switch 62, switch plate 63, etc. The distribution tubing 45 enters with a loose fit through an appropriate opening in the rear wall 75 of the dispensing head and electric cord 72 similarly extends through a hole in the rear wall grommeted at 76 to insulate the cord from the dispensing head box.

To protect the dispensing head against entry of moisture, the top edge of the face plate 74 is provided with a downwardly extending lip 77 which engages an upwardly extending lip 78 on the top wall 79 of the dispensing head. The face plate is thus suspended from the top wall of the dispensing head box secured by a single screw 80 in the bottom wall 81. By removing screw 80 and lifting the face plate 74 free, the tube 45, and cord 72 can be readily drawn through the box to provide ready access to the components housed within.

As an additional safeguard against introduction of moisture into the dispensing head, switch plate 63 is provided with an outwardly extending flange 82. Switch plate 63 is desirably formed of a transparent or translucent material. A signal light 83, such as a small neon tube or similar low wattage lighting element, is positioned behind the switch plate. This signal light is adapted to be on at all times when the dispensing unit is ready for use for the dispensing of liquor. This signal light goes off when the power source is interrupted or when the level of liquor in the supply vessel becomes low.

A level warning device is incorporated into the dispensing unit in the form of a float 84 suspended on an arm 85 from the arm 86 of a normally closed switch 87, which in turn is mounted on a bracket 88 from the supply vessel. Float 84 is positioned in the level indicating tube 19 of the supply vessel. As the level of liquid in the supply vessel is lowered through use, the normally closed switch 87 is opened to cut off the flow of current to the signal light 83 and to prevent the flow of current to motor 60 upon further actuation of switch 62 in the dispensing head.

The float 84 may be set at any desired, predetermined level in the supply vessel. The dispensing unit must be deactivated before the level in the supply vessel becomes so low that air will be pumped as this would interfere with the accuracy of measurement of subsequently dispensed portions. The float must also be set to deactivate the dispensing apparatus at any time when the amount of liquor in the supply vessel is less than one measured portion of the predetermined size being dispensed.

A fuse holder 89 is mounted in the front wall 12 of the base 10 to permit easy insertion of fuses to protect the circuit of the dispensing apparatus. The fuse holder is accessible from the exterior of the housing.

In the event it is desired to completely empty the dispenser, this may be done by simultaneously depressing the switch plate 63 in the dispensing head and the button of switch 90 mounted in the front wall 12 of the base 10. Switch 90 is normally open and when closed permits bypassing of the float controlled shut-off. At the same time, each measured quantity of liquor dispensed during the emptying of the unit is recorded on the counter 67.

To insure against tampering with the mechanism, a projecting lug 91 is preferably provided in the front wall 12 of the base 10. A corresponding hole is provided in the bottom edge of the front wall of housing 16. As the housing 16 is fitted over the base 10, lug 91 extends through the hole in the housing. A wire 92 is passed through a transverse hole in the lug and is sealed with a lead seal 93 or similar sealing means which must be destroyed before access can again be had to the mechanism inside the housing.

In the operation of the liquor dispenser according to the present invention, the unit is plugged into a source of electrical power and the supply reservoir 17 is partially filled with liquor by the inversion of an open bottle in the receptacle 18 through an opening 23 in the top of the unit. As the level in the supply vessel rises, float 84 rises to close switch 87 to energize the circuit of the dispensing unit. This is indicated by lighting of the signal lamp 83. Fitting 38 is then opened slightly to permit venting of air from the bellows pump 32, the bellows pump is operated until all air in it has been expelled. This is indicated by the escape of the first drop of liquor from the vent hole 39. The fitting 38 is immediately tightened. The pump is then operated to expel any air in the distribution tube 45, between the measuring unit and the dispensing head. The unit is then ready for use for accurate measuring and dispensing of successive uniform portions of liquor so long as a supply is maintained in the supply vessel.

The size of the predetermined measured portion is determined by adjustment of the stroke of connecting rod 53 and corresponding adjustment of the stroke of compression lever 49. For purposes of recording the number of drinks dispensed, a reading on the counter is noted at this point. Thereafter, as each unit of liquor is dispensed, the bartender need merely touch the switch plate 63 with the edge of the glass into which the liquor is to be measured. This actuates switch 62 which actuates electric motor 60 to rotate shaft 58 and cams 57 and 65. As cam 57 begins to rotate, switch 64 is closed to supply current directly to the motor. As cam 65 is rotated, switch 66 is closed to supply current to the counter to record one measuring cycle.

As cam 57 rotates, connecting rod 53 is moved downwardly by its pivotal connection 56 with cam 57 to exert a force on compression plate 49 to compress bellows pump 32 to expel the predetermined amount of liquor from the bellows. This predetermined amount of expelled liquor passes through check valve 31 and fitting 40, through elbow 41 and check valve 42, into pipe 43 and distribution tube 45 to spigot 47, from which it is dispensed into the glass held there. Flow of liquor from the bellows pump to the supply vessel is prevented by the ball valving element of check valve 31.

As cam 57 continues in its cycle of rotation, connecting rod 53 is moved upwardly to release the force on compression plate 49. The bellows then relaxes upon the release of compression and expands aided by helical compression coil spring 35. As the bellows expands, further liquor is drawn into the bellows from the supply vessel unseating the ball valving element of check valve 31. Withdrawal of liquid from the distribution tube is precented by the ball valving element of check valve 42. At the end of the cycle of rotation of cam switch 64 is opened to deenergize the motor until again actuated by switch 62 to dispense another shot.

Successive measured portions of uniform size are dispensed and counted so long as the supply in the supply vessel is maintained. When that supply falls below a predetermined level, the lowering of float 84 operates to open the normally closed switch 87 to deenergize the circuit to prevent further operation until the supply is replenished. The need for refilling is signaled visually by the extinguishing of the signal lamp 83. Where desired an audible signal or a flashing visual signal or the like can readily be incorporated into the circuit. When the supply is replenished, float 84 rises to again close switch 87 to restore the circuit. If, for any reason, it is desired to completely empty the unit, this may be done by simultaneously pressing switch plate 63 and the button of switch 90.

In normal use, one liquor dispenser is used for each of the most commonly dispensed liquors at that particular bar or bar station. For example, one unit will dispense bourbon, another scotch, another vodka, another gin, etc., as desired or required. A plurality of units may be interconnected electrically by connecting the power supply socket 69 of one unit with the auxiliary socket 73 of an adjacent unit.

Where it is desired to automatically mix a drink composed of different liquors, this can readily be done in several ways. For example, in the case of a Manhattan cocktail made according to the traditional two to one formula, one dispensing unit is set to dispense one measured portion of vermouth and the other is set to dispense two measured portions of whiskey and these portions are delivered to a common spigot, which may either be single or double.

Where a double spigot is used greater variation in proportion may be made available by incorporating a flow retarding means in one of the spigots. This would normally be in the vermouth spigot in the case of a Manhattan or martini. Although the dispensing unit would measure out the same predetermined portion on each dispensing cycle, the flow retarding means prevents discharge of all of this measured amount. For convenience in dispensing mixed drinks, two dispensing units are contained in a single housing operating from a single motor and gear box, but duplicating the other components of the device.

In order to prevent after-hours tampering with the dispensing unit, a key locked switch is desirably incorporated in the electrical circuit. In this manner, the bar proprietor may lock the dispensing units against operation by custodial employees and the like. In order to provide security for the bottles whose contents are being dispensed, the housing is desirably provided with a flexible strap firmly secured to one side of the housing and adapted to extend over the top of the bottle and to be secured and locked to the other side of the housing. Such security measures are necessary only when the dispensing units are left unsupervised, such as after-hours. Where local laws and regulations permit, a coin controlled switch may be used to initiate the dispensing cycle.

It is apparent that many modifications and variations of this invention as hereinbefore set forth may be made without departing from the spirit and scope thereof. The specific embodiments described are given by way of example only and the invention is limited only by the terms of the appended claims.

I claim as my invention:

1. A bar dispenser for automatically measuring and discharging successive uniform predetermined smaller portions of liquor from a larger supply, which dispenser comprises:
   (A) a supply vessel adapted to contain a quantity of liquor,
   (B) a resilient compressible bellows pump in communication with said supply vessel,
   (C) a check valve between said bellows pump and supply vessel to permit flow only in the direction of the bellows pump,
   (D) a dispensing spigot,
   (E) a distribution line between said bellows pump and spigot and a check valve in said distribution line to permit flow only in the direction of the spigot;

(F) a pivoted compression lever positioned adjacent one end of said bellows pump to compress the same,
(G) an electric motor,
(H) cam means adapted to be driven by said motor,
(I) connecting rod means eccentrically mounted relative to said cam means and secured to said compression lever,
(J) switch means associated with said spigot to energize said motor and
(K) switch means associated with one peripheral edge of said cam means to deenergize said motor after one cycle of rotation of said cam means.

2. A bar dispenser according to claim 1 further characterized in that said bellows is generally cylindrical and comprised of a plurality of pleats composed of a nontoxic alcohol-proof synthetic resinous material.

3. A bar dispenser according to claim 2 further characterized in that said pleats are in the form of a continuous helix and that a compression coil spring is disposed around the outside of the bellows in the valleys between said pleats.

4. A bar dispenser according to claim 1 further characterized in that one end of said bellow is provided with a combined entry and outlet port in communication with said supply vessel and the other end of said bellows is provided with an integral vent tube, a check valve in said vent tube to permit outflow only and a cap closure fitting over the end of said vent tube to prevent functioning of said check valve to permit outflow when said closure is in place.

5. A bar dispenser according to claim 1 further characterized in that said connecting rod is secured to said compression lever by fastening means movable longitudinally along the axis of the connecting rod whereby the compression stroke of said lever may be varied to vary the maximum internal volume of the bellows.

6. A bar dispenser according to claim 1 further characterized by the presence of electrically operated counting means and switch means associated with said cam means to energize and deenergize said counter during each cycle of rotation of said cam means.

7. A bar dispenser according to claim 1 further characterized in that said supply vessel includes a vertical level indicating tube, a float suspended in said tube, a normally closed switch in the circuit for energizing said motor, said float being suspended from an arm of said switch, whereby when the level in said tube lowers said float to actuate said switch the motor is inoperative until the supply is replenished to raise the level.

8. A bellows for use in a liquid dispenser, said bellows having circular end walls and being generally cylindrical with pleated side walls, said bellows being compressible and composed of a resilient synthetic resinous material, the pleats of said side walls being in the form of a continuous helix and a compression coil spring disposed in the valleys between said pleats around the outside of the bellows, one end wall of said bellows being provided with an integral outwardly projecting tubular combined entry and outlet port and the opposite end wall of said bellows being provided with an integral vent tube, a check valve in said vent tube to permit outflow only and a cap closure fitting over the end of the vent tube to prevent functioning of said check valve to permit outflow when said closure is in place.

9. A bar dispenser for automatically measuring and discharging successive uniform predetermined smaller portions of liquor from a larger supply, which dispenser comprises a supply vessel adapted to support an inverted bottle of liquor and contain a quantity of liquor, a discharge port in the bottom of said supply vessel; a bellows having top and bottom circular end walls and being generally cylindrical with pleated sidewalls, said bellows being compressible and composed of a resilient nontoxic alcohol-proof synthetic resinous material, the pleats of said side walls being in the form of a continuous helix, a compression coil spring disposed in the valleys between said pleats around the outside of the bellows, an entry port in the bottom end wall of said bellows in communication with the discharge port of the supply vessel through a check valve permitting flow only in the direction of the bellows, a vent tube in the top wall of the bellows, a check valve in said vent tube permitting outflow only and a cap fitting over the end of the vent tube; a dispensing spigot spaced from said bellows, a distribution line between said port in the bottom wall of the bellows and said spigot, and a check valve in said distribution line to permit flow only in the direction of the spigot; a pivotally mounted compression plate positioned above the top wall of said bellows to compress the same upon pivotal movement of the plate; an electric motor, cam means adapted to be driven by said motor, a connecting rod eccentrically mounted with respect to said cam means and secured to said compression plate on the side opposite to the pivotal mounting thereof, means movable along the direction of the longitudinal axis of said connecting rod to vary the stroke of said rod whereby the compression stroke of said pivoted plate may be varied to vary the maximum internal volume of said bellows and amount of liquor measured thereby; switch means associated with said spigot to energize said motor and switch means associated with the peripheral edge of said cam means to deenergize said motor after one cycle of rotation of said cam means.

10. A bar dispenser according to claim 9 further characterized by the presence of electrically operated counting means and switch means associated with said cam means to energize and deenergize said counter during each cycle of rotation of said cam means.

11. A bar dispenser according to claim 9 further characterized in that said supply vessel includes a vertical level indicating tube, a float suspended in said tube, a normally closed switch in the circuit for energizing said motor, said float being suspended from an arm of said switch, whereby when the level in said tube lowers said float to actuate said switch the motor is inoperative until the supply is replenished to raise the level.

References Cited by the Examiner

UNITED STATES PATENTS

| | | | |
|---|---|---|---|
| 1,752,085 | 3/30 | Hinkle | 222—212 X |
| 1,874,025 | 8/32 | Clapp | 222—63 |
| 2,349,875 | 5/44 | Mandlak | 222—212 X |
| 2,831,609 | 4/58 | Montbriand et al. | 222—76 |
| 2,972,434 | 2/61 | James | 222—66 |
| 3,012,695 | 12/61 | Lerner | 222—215 X |
| 3,107,824 | 10/63 | Perl | 222—207 |

LOUIS J. DEMBO, *Primary Examiner.*